United States Patent [19]

Takamizawa et al.

[11] Patent Number: 5,096,626

[45] Date of Patent: Mar. 17, 1992

[54] PROCESS OF MOLDING A COATED PLASTIC LENS

[75] Inventors: Morio Takamizawa; Takao Fujisawa; Singo Shiotani; Koji Futaki, all of Tokyo, Japan

[73] Assignee: Asahi Kogaku Kogyo Kabushiki Kaisha, Tokyo, Japan

[21] Appl. No.: 363,684

[22] Filed: Jun. 9, 1989

[30] Foreign Application Priority Data

| Jun. 10, 1988 | [JP] | Japan | 63-143123 |
| Jun. 10, 1988 | [JP] | Japan | 63-143124 |
| Jun. 10, 1988 | [JP] | Japan | 63-143125 |
| Jun. 10, 1988 | [JP] | Japan | 63-143126 |
| Jun. 10, 1988 | [JP] | Japan | 63-143127 |

[51] Int. Cl.⁵ .............................................. B29D 11/00
[52] U.S. Cl. .................................... 264/1.7; 264/2.3
[58] Field of Search ................... 264/1.4, 1.7, 1.9, 2.3

[56] References Cited

U.S. PATENT DOCUMENTS

| 3,968,309 | 7/1976 | Matsuo et al. | 264/1.4 |
| 4,544,572 | 10/1985 | Sandvig et al. | 427/44 |
| 4,919,850 | 4/1990 | Blum | 264/1.7 |

FOREIGN PATENT DOCUMENTS

| 56-84920 | 7/1956 | Japan . |
| 56-150701 | 11/1981 | Japan . |
| 109629 | 7/1982 | Japan | 264/1.9 |
| 109630 | 7/1982 | Japan | 264/1.9 |
| 146001 | 8/1984 | Japan | 264/1.7 |
| 62-96902 | 5/1987 | Japan . |
| 231712 | 10/1987 | Japan | 264/1.7 |

Primary Examiner—James Lowe
Attorney, Agent, or Firm—Sandler, Greenblum, & Bernstein

[57] ABSTRACT

A plastic lens having a hard coat film and/or anti-reflecting film strongly adhered and having no defects such as yellowing, milky turbidities, cracks is provided. The plastic lens can be produced according to the present invention by forming an anti-reflecting film and/or a hard coat film on the working surfaces of a pair of molds, pouring a monomer liquid into the space between said molds and a ring gasket and polymerizing the monomer therein. Formation of the anti-reflecting film and/or the hard coat film can be carried out by coating of a hard coat solution or by a vacuum deposition of inorganic substances. When the anti-reflecting film and/or the hard coat film is formed by coating of a hard coat solution, a hard coat solution containing at least one release agent is applied to the working surfaces of the molds, or, after applying a release agent to the working surfaces of the molds, a hard coat solution containing no release agent is applied to the release agent layer.

26 Claims, 2 Drawing Sheets

PROCESS OF MOLDING A COATED PLASTIC LENS

BACKGROUND OF THE INVENTION

1. Field of the Invention

The present invention relates to a plastic lens and a process for the production thereof.

2. Description of the Related Art

Recently, a plastic lens has been widely used as a lens for spectacles or cameras because of its lightness, excellent impact resistance and dyeability as compared with an inorganic glass lens.

In general, a plastic lens has been conventionally produced in accordance with a casting method in which a monomer liquid is poured into a glass or metallic mold that has previously been coated with a release agent, polymerized and hardened and then the lens is removed from the mold. After washing, the lens is first provided with a hard coat film, and then with an anti-reflecting film.

However, coating of each mold with a release agent is very cumbersome and reduces working efficiency. On the other hand, use of an internal release agent causes a milky turbidity.

With respect to methods of forming an anti-reflecting film and a hard coat film, there have been known two methods; namely, a method of coating and hardening organic substances and a vacuum deposition method utilizing inorganic substances.

In the method of coating and hardening organic substances, the plastic lens is coated with a hard coat solution. However, it is difficult in this method to obtain a hard coat film which adheres strongly to the surface of the lens, because wettability may vary depending upon the construction materials of the lens, as well as the hard coat solution. It is already known that the surface of the lens may be pre-treated for example, with an activated gas or a chemical agent, in order to improve the adhesion between the plastic lens and the hard coat film. However, such treatment is troublesome. Moreover, this method has a further disadvantage in that it is necessary to carry out the heat treatment of the hard coat solution under a restricted temperature range, since most plastic lenses are yellowed or distorted at a temperature above 120° C.

On the other hand, a vacuum deposition method can give a dense hard film. However, since this film lacks flexibility, it may be cracked by temperature changes, when there is a difference in expansion coefficient between the base material of the lens and the film. Further, the plastic lens cannot be heated to a sufficiently high temperature to achieve vacuum deposition because of water absorption properties of plastics, so that an anti-reflecting film having a constant refractive index and a definite reflection color cannot be obtained. In addition, this method has additional drawbacks in that it is both expensive and lacking in productivity, because exhaust must be continued for at least one hour to achieve a degree of vacuum of $10^{-5}$ torr.

As described above, since most plastic lenses are yellowed or distorted at a temperature above 120° C., substances requiring a heat treatment at a high temperature for the deposition cannot be used. For example, $MgF_2$ which is conventionally used as a component for a film of a low refractive index cannot be employed as an anti-reflecting film component for a plastic lens, because $MgF_2$ must be heated to about 200° C. or more.

SUMMARY OF THE INVENTION

An object of the present invention is to provide a plastic lens having a hard coat film and/or an anti-reflecting film, in which excellent adhesion is achieved between the lens and the film as well as between both films.

Another object of the present invention is to provide a plastic lens having a hard coat film and/or an anti-reflecting film and no defects, such as yellowing, milky turbidities, of cracks.

Another object of the present invention is to provide an inexpensive and simple process for the production of such plastic lens without restriction in treatment temperature, and in materials to be used, and which has a high productivity.

These objects can be achieved according to the present invention by providing a plastic lens produced by forming an anti-reflecting film and/or a hard coat film on the working surfaces of a pair of plate molds, pouring a monomer liquid into the space between said molds and a ring gasket, and polymerizing the monomer therein.

BRIEF DESCRIPTION OF THE DRAWINGS

Various other objects, features and advantages of the present invention will be apparent from the following description taken in conjunction with the accompanying drawings, wherein.

DETAILED DESCRIPTION OF PREFERRED EMBODIMENTS

The process for the production of a plastic lens in accordance with the present invention comprises the steps of:

forming an anti-reflecting film and/or a hard coat film on the working surfaces of a pair of plate molds, pouring a monomer liquid into the space between said molds and a ring gasket, and polymerizing the monomer therein.

In the practice of the present invention, molds made of a glass or metal can be used. The ring gasket can be made of any material such as a polymer, for example, polyvinyl chloride, polyvinyl acetate, polyethylene, etc., or a silicone resin.

In the process of the present invention, formation of the anti-reflecting film and/or the hard coat film can be carried out by coating of a hard coat solution or by a vacuum deposition of inorganic substances.

When the anti-reflecting film and/or the hard coat film is formed by coating of a hard coat solution, the working surfaces of the molds can be pretreated with a release agent. Alternatively, a hard coat solution containing at least one release agent can be applied to the working surfaces of the molds.

Figure 1:
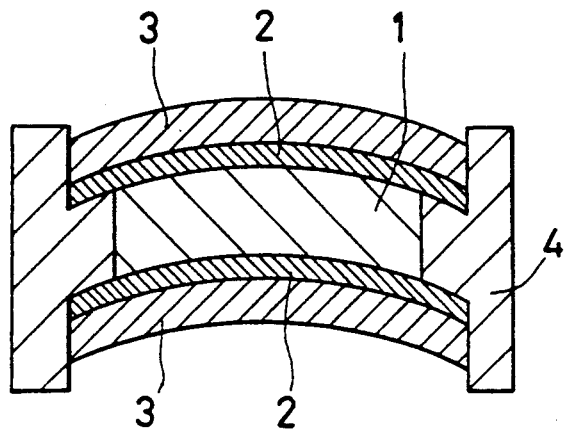
FIG. 1 is a cross-sectional view of a plastic lens produced according to an embodiment of the present invention and still located in the molds.

FIG. 1 illustrates the production of a plastic lens having a hard coat film. In this embodiment, the plastic lens 1 is produced by forming a hard coat film 2 on the working surfaces of a pair of molds 3, pouring a monomer liquid into the space between said molds 3 and a ring gasket 4, and polymerizing the monomer.

In the embodiment illustrated in FIG. 1, formation of the hard coat film 2 is carried out by coating the working surfaces of the molds with a hard coat solution containing a release agent. As a release agent which can be used, there may be mentioned, for example, various silicones, fluorosilicones, fluoroalkylalkoxysilanes, mineral oils, fatty acids, fatty esters, polyvinylalcohol, fluorocarbons, alkyl phosphates or the like. The preferred release agents are the fluoroalkylalkoxysilanes such as 3,3,3-trifluoropropyltrimethoxysilane represented by the formula: $CF_3CH_2CH_2Si(OCH_3)_3$, fluorooctyltrimethoxysilane represented by the formula: $CF_3(CF_2)_5CH_2CH_2Si(OCH_3)_3$ and the like. The release agent is added to the hard coat solution in an amount of 0.1~1% by weight, preferably 0.2~0.6% by weight, based on total weight of the hard coat solution. When the amount of the release agent is less than 0.1% by weight, the release effect cannot be attained. On the other hand, when the release agent is in excess of 1% by weight, the obtained lens may lose clarity.

As a hard coat solution, any conventional hard coat solution can be used, insofar as it contains the release agent as described above. For example, useful hard coat solutions include liquids in which at least one refractive index-adjusting component selected from the group consisting of colloidal silica, colloidal antimony oxide and colloidal titanium oxide, and at least one film-forming component such as a silane coupling agent, a hardening agent and the like are dispersed together with other additives in a solvent.

The colloidal silica, colloidal antimony oxide or colloidal titanium oxide is a colloidal solution in which ultrafine particles of silicic anhydride, antimony pentoxide or titanium dioxide, respectively, are dispersed in water or in an alcoholic dispersion medium and is available in the market. Alcohols which can be used as a dispersion medium for the oxide include methanol, ethanol, isopropyl alcohol and the like. The amount of the colloidal silica, colloidal antimony oxide and/or colloidal titanium oxide used can be determined according to the refractive index to be adjusted and is usually 10~80% by weight, and preferably 10~50% by weight in the hard coat solution.

Various silane coupling agents can be used in the present invention without any limitation. The silane coupling agents which can be used include, for example, a compound represented by the following general formula:

wherein $R^1$ is an alkyl group, an alkenyl group, a phenyl group or a halogen atom, $R^2$ is an organic group having epoxy, glycidoxy, amino, amide, mercapto, methacryloyloxy, cyano and/or aromatic group having at least one substituent, X is a hydrolyzable group such as halogen, an alkoxy group, an alkoxyalkoxy group or an acyloxy group, each of m and n is a value of 0 to 2, and $m+n \leq 3$, and a full or partial hydrolysate thereof.

Exemplary silane coupling agents represented by the above formula include tetrafunctional silanes such as tetramethoxysilane, trifunctional silanes such as methyltrimethoxysilane, methyltriethoxysilane, γ-chloropropyltrimethoxysilane, vinyltrimethoxysilane, γ-methacryloyloxypropyltrimethoxysilane, β-(3,4-epoxycyclohexyl)ethyltrimethoxysilane, γ-glycidoxypropyltrimethoxysilane, γ-mercaptopropyltrimethoxysilane, γ-aminopropyltrimethoxysilane, N-β-(aminoethyl-γ-aminopropyltrimethoxysilane, γ-ureidopropyltrimethoxysilane, γ-cyanopropyltrimethoxysilane, γ-morpholinopropyltrimethoxysilane, N-phenylaminopropyltrimethoxysilane, bifunctional silanes in which the said trifunctional silanes are partially substituted by an alkyl group, a phenyl group or a vinyl group etc. such as dimethyldimethoxysilane, vinylmethyldimethoxysilane, phenylmethyldimethoxysilane, γ-chloropropylmethyldimethoxysilane, γ-glycidoxypropylmethyldiethoxysilane and the like. The full or partial hydrolysates of the compounds mentioned above can be also employed. The silane coupling agent is used in a concentration of 1~40% by weight, preferably of 3~20% by weight in the hard coat solution.

As a hardening agent, there may be mentioned organic amines, such as triethylamine, n-butylamine, etc.; amino acids, such as glycine, etc.; metal acetylacetonates, such as aluminum acetylacetonate, chromium acetylacetonate, titanium acetylacetonate, cobalt acetylacetonate, etc.; metal salts of organic acids, such as sodium acetate, zinc naphthenate, cobalt naphthenate, zinc caprylate, tin coprylate, etc.; and Lewis acids, such as stannic chloride, aluminum chloride, ferric chloride, titanium chloride, zinc chloride, antimony chloride, etc.. Among these hardening agents, aluminum acetylacetonate is preferred.

Based upon workability of the coating, preferably the above-described components are dissolved in a suitable solvent to obtain a hard coat solution. Useful solvents include lower alcohols, such as methanol, ethanol, propanol, butanol, etc.; ethers, such as Cellosolve, etc.; ketones, such as acetone, etc.; formamides, such as dimethyl formamide etc.; "FREON" (trademark used on fluorinated hydrocarbons produced by E. I. du Pont de Nemours & Co., Inc.) or water. Usually, a solution of solid content of 1~40% by weight in said solvent is preferably used. The solid content in the hard coat solution is not limited to the above range, but will be suitably selected depending upon other conditions.

In addition, surfactants, UV absorbing agents, antioxidants, thixotropic agents, pigments, dyes, antistatic agents and conductive particles, etc. can be added to the hard coat solution.

The hard coat film is formed by coating the working surface of a pair of molds with a hard coat solution containing the above-described components according to a conventional method and hardening the coated solution. Coating can be carried out, for example, by flow coating, dip coating, spin coating, roll coating, spray coating, or the like. Drying and hardening can preferably be carried out by heating the coated solution at a temperature of 80°~300° C. for 30 minutes to 3 hours depending upon the used components.

Hardening can be carried out by irradiating the coated solution with infrared, ultraviolet, gamma or electron radiation, so as to promote crosslinkage or polymerization reaction of the reactive radical of the used components.

The thickness of the hard coat film can be adjusted by selection of a solvent or a coating method and is usually 1~10 μm and preferably 2~5 μm.

After forming the hard coat film on the working surface of a pair of the molds, a monomer liquid is poured into the space between said molds and the ring gasket, polymerized and hardened according to the conventional method.

The monomer liquid which can be used in the present invention contains a monomer (and comonomer), a polymerization initiator and other additives which are needed for the production of the plastic to be molded into a lens.

The process of the present invention is applicable to various plastic lens. As a plastic for lenses, there may be mentioned, for example, acrylic resin, polycarbonates, diethylene glycol bis(allyl carbonate) polymer, diacrylate or dimethacrylate polymer and copolymer of (halogenated)bisphenol A, urethane-modified acrylate or methacrylate polymer and copolymer of (halogenated) bisphenol A, and polyurethane resin such as urethane resin consisting of a diisocyanate and a polyol mercaptoalkyl ester.

After polymerization and hardening of the monomer, the plastic lens is released from the molds. The thus obtained plastic lens already has a hard coat film and can be dyed, if desired.

In accordance with the above embodiment of the present invention, because a hard coat film to be formed on the lens is previously formed on the working surfaces of the molds, formation of the hard coat film can be carried out without limitation in the conditions of heat treatment. The heat treatment can be carried out at a higher temperature as compared with a conventional method without distortion and yellowing of the lens. Therefore, the heat treatment time can be shortened.

Further, the hard coat solution shows good wettability according to the process of the present invention, whereas wettability may vary depending upon materials of the lens and the hard coat solution in the conventional method in which a molded plastic lens is coated with the hard coat solution.

In addition, because a monomer liquid is poured into the space between a pair of the molds and the ring gasket, on the working surfaces of which a hard coat film had already previously been formed, and then polymerized, excellent adhesion between the hard coat film and the lens can be attained according to the present invention. Moreover, since the obtained lens has the hard coat film and shows high abrasion resistance and heat stability, the lens can be easily handled and dyed.

In accordance with the embodiment shown in FIG. 1, plastic lenses of outstanding quality can be produced without the operation of coating the molds with a release agent.

Figure 2:
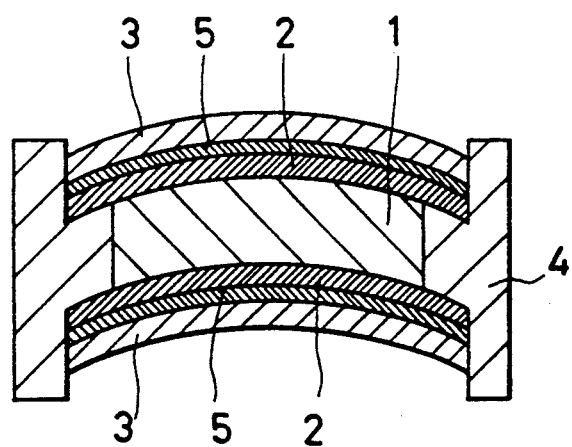
FIG. 2 is a cross-sectional view illustrating another embodiment of the present invention.

However, in another embodiment of the present invention, the operation of coating of the molds with a release agent can be carried out. As shown in FIG. 2, in this case, the release agent layer 5 and a hard coat film 2 are formed in this order on the working surfaces of a pair of the plate molds 3. In the practice of this embodiment, a hard coat solution may be the same as the above embodiment shown in FIG. 1, except that it contains no release agent.

Formation of the release agent layer 5 can be carried out by coating the working surfaces of the molds with a release agent by a dip coat method, a spin coat method, or the like, and if necessary, subjecting the release agent to heat treatment to harden the release agent, depending upon the nature of the release agent employed. A preferred release agent is a fluorosilicone liquid (available from SHINETSU CHEMICALS Co. Ltd. under the trade name of KP-801). After coating the working surfaces of the molds with the fluorosilicone liquid by a dip coat or spin coat method, the liquid is heated and hardened.

Subsequent to the formation of the release agent layer, the steps of forming the hard coat film, pouring a monomer liquid and the polymerization of the monomer liquid can be carried out in the same manner as described above in connection with the embodiment shown in FIG. 1.

In accordance with the embodiment shown in FIG. 2, the obtained plastic lens has high quality equivalent to that of the plastic lens illustrated in FIG. 1.

Figure 3:
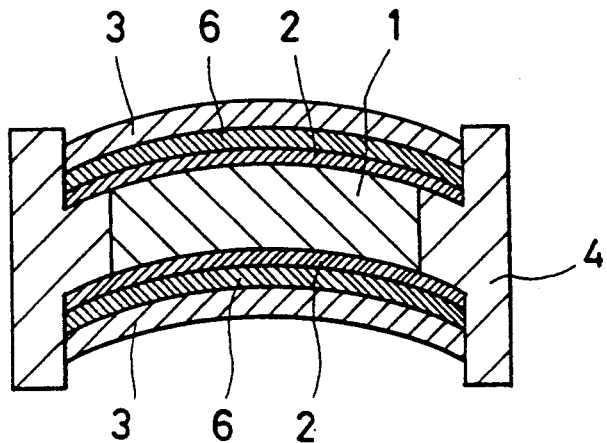
FIG. 3 is a cross-sectional view illustrating another embodiment of the present invention.
Figure 4:
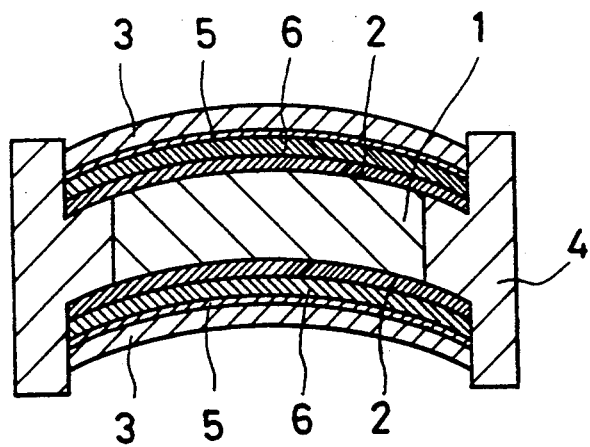
FIG. 4 is a cross-sectional view illustrating another embodiment of the present invention.

In accordance with the present invention, a plastic lens having both an anti-reflecting film and a hard coat film can be produced as illustrated in FIG. 3. In this embodiment, the working surfaces of a pair of the molds 3 are provided with the anti-reflecting film 6 by coating with a hard coat solution containing a release agent. The same hard coat solution as described above can be used to form the anti-reflecting film 6.

The anti-reflecting film may be composed of a single layer or multi-layers. Preferably, the anti-reflecting film is composed of hard coat multi-layers having different indices of refraction varied in the direction of the thickness of the film. In the case of the anti-reflecting film composed of the hard coat having multi-layers, a release agent may be added to the hard coat solution applied directly to the working surfaces of the molds.

The thickness of the anti-reflecting film can be adjusted by selection of a solvent or a coating method, and determined by a combination of the layers having different indices of refraction. Preferably, the anti-reflecting film is composed of three layers having an optical film thickness of $\frac{1}{4}$, $\frac{1}{2}$ and $\frac{1}{4}$, or $\frac{1}{4}$, $\frac{1}{4}$ and $\frac{1}{4}$ of design wavelength ($\lambda$).

After forming the anti-reflecting film 6 on the working surfaces of a pair of the molds 3, the hard coat film 2 having resistance to abrasion is formed on the film 6. In order to form the hard coat film 2, any hard coat solution can be used without limitation. The same hard coat solution as used for the anti-reflecting film 6 can be used except that the release agent is omitted. The thickness of the hard coat film 2 is usually 1~10µm, preferably 2~5µm.

After forming the anti-reflecting film 6 and the hard coat film 2 having resistance to abrasion on the working surfaces of a pair of the molds 3 in that order, a monomer liquid as the starting material of the plastic lens 1 is poured into the space between a pair of the molds 3 and the ring gasket 4 and then polymerized and hardened in a conventional manner.

Instead of utilizing the anti-reflecting film containing a release agent in the embodiment shown in FIG. 3, a release agent layer can be formed on the working surfaces of a pair of the molds 3. In this case, the working surfaces of a pair of the plate molds 3 are provided with a release agent layer 5, the anti-reflecting film 6 and the hard coat film 2 in this order as shown in FFG. 4. Thereafter, a monomer liquid as the starting material of the plastic lens 1 is poured into the space between a pair of the molds 3 and the ring gasket 4 and then polymerized and hardened in a conventional manner.

Furthermore, according to the present invention, the anti-reflecting film and/or the hard coat film can be formed by a vacuum deposition of inorganic substances. Various inorganic substances can be used. Useful inorganic substances include various oxides, halides and sulfides. As substances having a low refractive index, there may be mentioned $MgF_{32}$, $SiO_2$, $Na_3(AlF_4)$ and the like. As substances having a moderate or high refractive index, there may be mentioned $Al_2O_3$, $CeF_3$, a mixture of MgO and $Al_2O_3$, $ThO_2$, $Nd_2O_3$, $ZrO_2$, $CeO_2$, $TiO_2$, $Nb_2O_5$, $Ta_2O_5$, $Ya_2O_3$, $Yb_2O_3$, ZnS, AND the like.

The anti-reflecting film formed by the vacuum deposition may be composed of a single layer or multi-layers having different indices of refraction. The thickness of the anti-reflecting film can be determined by a combination of the layers having different indices of refraction. Preferably the anti-reflecting film consists of three layers having an optical film thickness of ¼, ½ and ¼, or ¼, ¼ and ¼ of design wavelength (λ).

Contrary to the case in which the film is formed on the plastic lens by a vacuum deposition, according to the present invention, conditions of temperature, etc. can be widely varied without limitation and suitably selected depending upon substances to be vacuum deposited, since the anti-reflecting film can be formed by a conventional vacuum deposition method on the working surfaces of a pair of glass or metallic molds.

Of course, the anti-reflecting film formed by the vacuum deposition can be coated with an organic hard coat solution to form a hard coat film.

In addition to the anti-reflecting film, the hard coat film can be formed by a vacuum deposition of inorganic substances which can form a hard film. Useful inorganic substances for the hard film include $SiO_2$, $Al_2O_3$, a mixture of $SiO_2$ and $Al_2O_3$ and the like. Conditions of the vacuum deposition can be suitably determined depending upon the substances to be used. The thickness of the hard film is usually $1 \sim 10\mu m$, preferably $2 \sim 5\mu m$.

In the embodiment of the present invention, in which the vacuum deposited film (the anti-reflecting film and/or the hard film) is previously formed on the working surfaces of a pair of molds and a plastic lens is molded in said molds, an extremely high temperature can be applied, inorganic substances to be deposited can be selected without any limitation and plastic lenses can be obtained without cracks, yellowing, distortion or the like. Further, a high degree of vacuum can be quickly attained in the practice of the vacuum deposition according to the present invention.

According to the process of the present invention, plastic lenses having an anti-reflecting film and/or a hard coat film can be inexpensively molded in a simple operation with high productivity in every embodiment as described above.

The present invention will be further described with reference to examples. However, it should be understood jthat the present invention is not limited to these examples and many variations and modifications may be made within the spirit and scope of the invention. In the following examples, "part" and "%" mean "part by weight" and "% by weight", respectively. Furthermore, all sols are used as a dispersion of 30% by weight of each oxide in a solvent.

EXAMPLE 1

Preparation of a Hard Coat Solution for a Hard Coat Film of Refractive Index n=1.60

A mixture of 20 parts of β-(3,4-epoxycyclohexyl)ethyltrimethoxysilane, 50 parts of γ-glycidoxypropyltrimethoxysilane and 30 parts of γ-glycidoxypropyltriethoxysilane as silane coupling agents was hydrolyzed with 30 parts of 0.1N hydrochloric acid and stirred at 20° C. for 24 hours. The so obtained hydrolysate was thoroughly mixed with 300 parts of antimony oxide sol dispersed in methanol (NISSAN CHEMICALS, Co. Ltd.) as oxide sols, 0.1 part of ZONYL FSN (E. I. du Pont de Nemours & Co.) as a surfactant, 0.5 part of aluminum acetylacetonate as a hardening agent, 2 parts of the mixture of fluoroalkylalkoxysilanes $[CF_3CH_2CH_2Si(OCH_3)_3$ and $CF_3(CF_2)_5CH_2CH_2Si(OCH_3)_3]$ as a release agent and 150 parts of isopropyl alcohol and 150 parts of methanol as a solvent. The so obtained hard coat solution (referred to as hard coat solution A-160 hereinafter) gives a hard coat film of a refractive index of 1.60.

(2) Treatment of Glass Molds

The hard coat solution A-160 was applied to the working surfaces of a pair of the glass molds by a dip coating method so as to form a film of actual thickness of 2 μm and hardened at 150° C. for one hour.

(3) Production of a Plastic Lens

A mixture of m-xylene diisocyanate and pentaerythritol tetrakis(3-mercaptopropionate) (monomer ratio=1:1.3 by weight) and 1,000 ppm of dibutyl tin dilaurate (polymerization initiator) was poured into the space between the two glass molds treated as above (2) and a ring gasket, and polymerized at 30° C. for 8 hours, 40° C. for 5 hours and 120° C. for 4 hours to obtain a plastic lens having the hard coat film. The resin of the lens and the hard coat film showed a refractive index of 1.60.

EXAMPLE 2

(1) Preparation of a Hard Coat Solution for a Hard Coat Film of Refractive Index n=1.50

A mixture of 50 parts of γ-glycidoxypropyltrimethoxysilane and 50 parts of γ-glycidoxypropylmethyldiethoxysilane as silane coupling agents was hydrolyzed with 25 parts of 0.1N hydrochloric acid and stirred at 20° C. for 24 hours. The so obtained hydrolysate was thoroughly mixed with 300 parts of silica sol dispersed in methanol (NISSAN CHEMICALS, Co. Ltd.; MA-ST), 0.1 part of ZONYL FSN as a surfactant, 0.5 part of aluminum acetylacetonate as a hardening agent, 2 parts of fluoroalkylalkoxysilane $[CF_3CH_2CH_2Si(OCH_3)_3]$ as a release agent and 350 parts of methanol as a solvent. The so obtained hard coat solution (referred to as hard solution A-150 hereinafter) gives a hard coat film of a refractive index of 1.50.

(2) Treatment of Glass Molds

The hard coat solution A-150 was applied to the working surfaces of a pair of the glass molds by a dip coating method so as to form a film of actual thickness of 2 μm and hardened at 150° C. for one hour.

(3) Production of a Lens

Diethylene glycol bis(allyl carbonate) monomer was poured into the space between the two glass molds treated as above (2) and a ring gasket and polymerized at 40° C. for 8 hours, 50° C. for 2 hours, 70° C. for 2 hours and 80° C. for 3 hours to obtain a plastic lens having the hard coat film. The resin of the lens and the hard coat film showed a refractive index of 1.50.

EXAMPLE 3

(1) Preparation of a Hard Coat Solution (Containing No Release Agent) For a Hard Coat Film of Refractive Index n=1.60

A mixture of 20 parts of β-(3,4-epoxycyclohexyl)-ethyltrimethyxysilane, 60 parts of γ-glycidoxypropyltrimethoxysilane and 20 parts od γ-glycidoxypropylmethyldiethoxysilane as silane coupling agents was hydrolyzed with 25 parts of 0.1N hydrochloric acid and stirred at 20° C. for 24 hours. The so obtained hydrolysate was thoroughly mixed with 250 parts of antimony oxide sol dispersed in methanol, 0.1 part of ZONYL FSN as a surfactant, 0.5 part of aluminum acetylacetonate as a hardening agent and 300 parts of isopropylalcohol as a solvent. The so obtained hard coat solution (referred to as hard coat solution AN-160 hereinafter) gives a hard coat film of a refractive index of 1.60.

(2) Treatment of Glass Molds

The working surfaces of a pair of the glass molds was coated by a dip coating method with the fluorosilicone coating liquid (SHINETSU CHEMICALS Co. Ltd,. KP-801) and the liquid was heated and hardened at 120° C. for one hour. The hard coat solution AN-106 was applied to the release agent layer of the glass molds to a film thickness of about 3.0 μm and heated at 150° C. for one hour.

(3) Production of a Plastic Lens

The procedure of the Example 1 (3) was repeated with the exception that a pair of the glass molds treated as above (2) and having the release agent layer and the hard coat film was used. The so obtained plastic lens showed a refractive index of 1.60.

EXAMPLE 4

(1) Preparation of a Hard Coat Solution (Containing No Release Agent) For a Hard Coat Film of Refractive Index n=1.50

A mixture of 50 parts of γ-glycidoxypropyltrimethoxysilane and 50 parts of γ-glycidoxypropylmethyldiethoxysilane as silane coupling agents was hydrolyzed with 25 parts of 0.1N hydrochloric acid and stirred at 20° C. for 24 hours. The so obtained hydrolysate was thoroughly mixed with 250 parts of silica sol dispersed in isopropyl alcohol (SHOKUBAI KASEI, Co. Ltd.; OSCAL 1432), 0.1 part of ZONYL FSN as a surfactant, 0.5 part of aluminum acetylacetonate as a hardening agent and 300 parts of isopropyl alcohol as a solvent. The so obtained hard coat solution (referred to as hard coat solution AN-150 hereinafter) gives a hard coat film of a refractive index of 1.50.

Treatment of Glass Molds

The working surfaces of a pair of glass molds was coated by a dip coating method with the florosilicone coating liquid (SHINETSU CHEMICALS Co. Ltd., KP-801) and the liquid was heated and hardened at 120° C. for an hour. The hard coat solution AN-150 was applied to the release agent layer of the glass molds to a film thickness of about 4.0 μm and heated at 150° C. for one hour.

(3) Production of a Plastic Lens

Thereafter, the procedure of the Example 2 (3) was repeated with the exception that a pair of glass molds treated as above (2) and having the release agent layer and the hard coat film was used. The resin and the hard coat film of the obtained plastic lens showed a refractive index of 1.50.

EXAMPLE 5

(1a) Preparation of a Hard Coat Solution For a Hard Coat Film of Refractive Index n=1.40

A mixture of 70 parts of methyltrimethoxysilane and 30 parts of γ-glycidoxypropylmethyldiethoxysilane as silane coupling agents was hydrolyzed with 25 parts of 0.1N hydrochloric acid and stirred at 20° C. for 15 hours. The sao obtained hydrolysate was thoroughly mixed with 300 parts of silica sol dispersed in methanol, 0.1 part of ZONYL FSN as a surfactant, 0.5 part of aluminum acetylacetonate as a hardening agent, 2 parts of a mixture of fluoroalkylalkoxysilane $[CF_3CH_2CH_2Si(OCH_3)_3$ and $CF_3(CF_2)_5CH_2CH_2Si(OCH_3)_3]$ as a release agent and 350 parts of methanol as a solvent to obtain the hard coat solution (referred to as hard coat solution A-140 hereinafter).

(1b) Preparation of a Hard Solution (Containing No Release Agent) for a Hard Coat Film of Refractive Index n=1.90

A mixture of 50 parts of γ-glycidoxypropyltrimethoxysilane and 50 parts of γ-glycidoxypropylmethyldiethoxysilane as silane coupling agents was hydrolyzed with 25 parts of 0.1N hydrochloric acid and stirred at 20° C. for 15 hours. The so obtained hydrolysate was thoroughly mixed with 500 parts of titanium oxide sol dispersed in methanol (SHOKUBAI KASEI, Co. Ltd., OSCAL-811), 0.1 parts of ZONYL FSN as a surfactant, 0.5 part of aluminum acetylacetonate as a hardening agent and 800 parts of methanol as a solvent to obtain the hard coat solution (referred to as hard coat solution AN-190 hereinafter).

(1c) Preparation of a Hard Coat Solution (Containing No Release Agent) for a Hard Coat Film of Refractive Index n=1.55

A mixture of 50 parts of γ-glycidoxypropyltrimethoxysilane, 30 parts of γ-glycidoxypropylmethyldiethoxysilane and 20 parts of β-(3,4-epoxycyclohexyl)ethyltrimethoxysilane as silane coupling agents was hydrolyzed with 30 parts of 0.1N hydrochloric acid and stirred at 20° C. for 15 hours. The so obtained hydrolysate was throughly mixed with 350 parts of anitmony oxide sol dispersed in methanol, 100 parts of titanium oxide sol dispersed in methanol, 0.1 part of ZONYL FSN as a surfactant, 1 part of aluminum acetylacetonate as a hardening agent and 800 parts of methanol as a solvent to obtain the hard coat solution referred to as hard coat solution AN-155 hereinafter).

(1d) Preparation of a Hard Coat Solution (Containing No Release Agent) For a Hard Coat Film of Refractive Index n=1.50

A mixture of 50 parts of γ-glycidoxypropyltrimethoxysilane and 50 parts of γ-glycidoxypropylmethyldiethoxysilane as silane coupling agents was hydrolyzed with 25 parts of 0.1N hydrochloric acid and stirred at 20° C. for 15 hours. The so obtained hydrolysate was thoroughly mixed with 300 parts of silica sol dispersed in methanol, 0.1 parts of ZONYL FSN as a surfactant, 0.5 part of aluminum acetylacetonate as a hardening agent and 350 parts of methanol as a solvent to obtain the hard coat solution (referred to as hard coat solution AN-150 hereinafter).

(2) Treatment of Glass Molds

The hard coat solution A-140 was applied to the working surfaces of a pair of glass molds by a dip coating method so as to form a film of optical thickness of $\lambda/4$ and hardened at 150° C. for one hour. (In this Example, the design wavelength was $\lambda=510$ nm).

Thereafter, the hard caot solution AN-190 was applied to the film formed above by a dip coating method so as to form a film of optical thickness of $\lambda/2$ and hardened at 200° C. for one hour. Furthermore, the hard coat solution AN-155 was applied to the film of the hard coat solution AN-190 by a dip coating method so as to form a film of optical thickness of $\lambda/4$ and hardened at 200° C. for one hour.

Then, the hard coat solution AN-150 was applied to the film of the hard coat solution AN-155 by a dip coating method so as to form a film of actual thickness of 2 $\mu$m and hardened at 150° C. for one hour.

(3) Production of a Plastic Lens

The procedure of the Example 2 (3) was repeated with the exception that a pair of glass molds treated as above (2) was used. The so obtained plastic lens had the anti-reflecting film and the hard coat film and showed total light transmittance of 99%.

After releasing, the plastic lens was immersed into a dye bath at 90° C. for 10 minutes to obtain the dyed plastic lens which showed extinction of 50% at 550 nm.

EXAMPLE 6

(1) Preparation of a Hard Coat Solution (Containing No Release Agent) For a Hard Coat Film of Refractive Index n=1.60

A mixture of 50 parts of $\gamma$-glycidoxypropylmethyldiethoxysilane, 30 parts of $\gamma$-glycidoxypropylmethyldiethoxysilane and 20 parts of $\beta$-(3,4-epoxycyclohexyl)ethyltrimethoxysilane as silane coupling agents was hydrolyzed with 30 parts of 0.1N hydrochloric acid and stirred at 20° C. for 15 hours. The so obtained hydrolysate was throughly mixed with 300 parts of antimony oxide sol dispersed in methanol, 150 parts of titanium oxide sol dispersed in methanol, 0.1 part of ZONYL FSN as a surfactant, 1 part of aluminum acetylacetonate as a hardening agent and 800 parts of methanol as a solvent to obtain the hard coat solution (referred to as hard coat solution AN-160 hereinafter).

(2) Treatment of Glass Molds

The hard coat solution A-140 was applied to the working surfaces of a pair of the glass molds by a dip coating method so as to form a film of optical thickness of $\lambda/4$ and hardened at 150° C. for 20 minutes (In this Example, the design wavelength was $\lambda=510$ nm).

Thereafter, the hard coat solution AN-190 was applied to the film formed above by a dip coating method so as to form a film of optical thickness of $\lambda/2$ and hardened at 200° C. for 20 minutes.

Then, the hard coat solution AN-160 was applied to the film formed above by a dip coating method so as to form a film of actual thickness of 2 $\mu$m and hardened at 150° C. for 20 minutes.

(3) Production of a Plastic Lens

The procedure of the Example 1 (3) was repeated with the exception that a pair of the glass molds treated as above (2) was used. The so obtained plastic lens having the anti-reflecting film and the hard coat film was dyeable and of refractive index n=1.60 and total light transmittance of 99%.

Example 7

(1) Preparation of a Hard Coat Solution (Containing No Release Agent For Hard Coat Film of Refractive Index n=1.60

A mixture of 60 parts of $\gamma$-glycidoxypropyltrimethoxysilane, 20 parts of $\gamma$-glycidoxypropylmethyldiethoxysilane and 20 parts of $\beta$-(3,4-epoxycyclohexyl)ethyltrimethoxysilane as silane coupling agents was hydrolyzed with 25 parts of 0.1N hydrochloric acid and stirred for 24 hours. The so obtained hydrolysate was throughtly mixed with 250 parts of antimony oxide sol dispersed in methanol, 0.1 part of ZONYL FSN as a surfactant, 0.5 part of aluminum acetylacetonate as a hardening agent and 300 parts of isopropyl alcohol as a solvent to obtain the hard coat solution (referred to as hard coat solution BN-160 hereinafter).

(2) Treatment of Glass Molds

The working surfaces of a pair of glass molds was coated by a dip coating method with the fluorosilicone coating liquid (SHINETSYU CHEMICALS Co. Ltd., KP-801) and the liquid was heated and hardened at 120° C. for one hour. The obtained glass molds having the release agent layer was placed into a vacuum deposition device. At first, $SiO_2$ was vacuum deposited on the release agent layer to an optical film thickness of $\lambda/4$ ($\lambda+510$ nm) to form a layer of refractive index n=1.45, and then $Ta_2O_5$ was vacuum deposited to an optical film thickness of $\lambda/4$ ($\lambda=510$ nm) to form a layer of refractive index n=2.00 and furthermore, $Yb_2O_3$ was vacuum deposited to an optical film thickness of $\lambda/4$ ($\lambda=510$ nm) to form a layer of refractive index n=1.80.

Finally, the obtained glass molds having the release agent layer and the anti-reflecting layers were coated with the hard coat solution BN-160 to a film thickness of about 2 $\mu$m and heated at 150° C. for one hour.

(3) Production of a Plastic Lens

The procedure of the Example 1 (3) was repeated with the exception that a pair of the glass molds treated as above (2) was used. The so obtained plastic lens having the anti-reflecting layers and the hard coat film was of total light transmittance of 98.5%.

EXAMPLE 8

(1) Preparation of a Hard Coat Solution (Containing no Release Agent) for a Hard Coat Film of Refractive Index n=1.50

A mixture of 50 parts of $\gamma$-glycidoxypropyltrimethoxysilane and 50 parts of $\gamma$-glycidoxypropylmethyldiethoxysilane as silane coupling agents was hydrolyzed with 25 parts of 0.1N hydrochloric acid and stirred for 24 hours. The so obtained hydrolysate was thoroughly mixed with 250 parts of silica sol dispersed in isopropylalcohol (SHOKUBAI KASEI Co. Ltd., OSCAL 1432), 0.1 part of ZONYL FSN as a surfactant, 0.5 part of aluminum acetylacetonate as a hardening agent and 300 parts of isopropyl alcohol as a solvent. The obtained hard coat solution (referred to as hard coat solution BN-150 hereinafter) forms a film of refractive index of 1.50 after heating at 150° C. for one hour.

(2) Treatment of Glass Molds

The working surfaces of a pair of the glass molds was coated by a dip coating method with the fluorosilicone coating liquid (SHINETSU CHEMICALS Co. Ltd., KP-801) and the liquid was heated and hardened at 120° C. for one hour. The obtained glass molds having the release agent layer was placed into a vacuum deposition device. At first, $MgF_2$ was vacuum deposited on the release agent layer to an optical film thickness of $\lambda/4$ ($\lambda=510$ nm) to form a layer of refractive index n=1.38, and then $TiO_2$ was vacuum deposited to an optical film thickness of $\lambda/2$ to form a layer of refactive index n=2.08 and furthermore, $Al_2O_3$ was vacuum deposited to an optical film thickness of $\lambda/4$ to form a layer of refractive index n=1.65.

Finally, the obtained glass molds having the release agent layer and the anti-reflecting layers were coated with the hard coat solution BN-150 to a film thickness of about 2 μm and heated at 150° C. for one hour.

(3) Production of a Plastic Lens

The procedure of the Example 2 (3) was repeated with the exception that a pair of the glass molds treated as above (2) was used. The so obtained plastic lens having the anti-reflecting layers and the hard coat film was of total light transmittance of 98.5%.

EXAMPLE 9

The working surfaces of a pair of glass molds was coated by a dip coating method with the fluorosilicone coating liquid (SHINETSU CHEMICALS Co. Ltd., KP-801) and the liquid was heated and hardened at 120° C. for one hour. The obtained glass molds having the release agent layer was placed into a vacuum deposition device. At first, $SiO_2$ was vacuum deposited on the release agent layer to an optical film thickness of $\lambda/4$ ($\lambda=510$ nm) to form a layer of refractive index n=1.45, and then $Ta_2O_5$ was vacuum deposited to an optical film thickness of $\lambda/4$ ($\lambda=510$ nm) to form a layer of refractive index n=2.00 and furthermore, $Yb_2O_3$ was vacuum deposited to an optical film thickness of $\lambda/4$ ($\lambda=510$ nm) to form a layer of refractive index n=1.86.

Finally, $SiO_2$ was vacuum deposited to form a layer of actual thickness of 2 μm and refractive index n=1.45.

Thereafter, the procedure of the Example 2 (3) was repeated with the exception that a pair of the glass molds treated as above was used. The so obtained plastic lens having the anti-reflecting layers and the hardening film was of total light transmittance of 98.5%.

EXAMPLE 10

The working surfaces of a pair of glass molds was coated by a dip coating method with the fluorosilicone coating liquid (SHINETSU CHEMICALS Co. Ltd., KP-801) and the liquid was heated and hardened at 120° C. for one hour. The obtained glass molds having the release agent layer was placed into a vacuum deposition device. At first, $MgF_2$ was vacuum deposited on the release agent layer to an optical film thickness of $\lambda/4$ ($\lambda=510$ nm) to form a layer of refractive index n=1.38, then $TiO_2$ was vacuum deposited to an optical film thickness of $\lambda/2$ to form a layer of refractive index n=2.08 and furthermore, $Al_2O_3$ was vacuum deposited to an optical film thickness of $\lambda/4$ to form a layer of refractive index n=1.65.

Finally, $SiO_2$ was vacuum deposited to form a layer of actual thickness of 2 μm and refractive index n=1.45.

Thereafter, the procedure of the Example 2 (3) was repeated with the exception that a pair of the glass molds treated as above was used. The so obtained plastic lens having the anti-reflecting layers and the hardening film was of total light transmittance of 99.5%.

We claim:

1. A process for the production of a plastic lens which comprises:
   forming at least one of an anti-reflecting film and a hard coat film on working surfaces of a pair of molds, said at least one of an anti-reflecting film and a hard coat film formed on working surfaces of a pair of molds containing at least one release agent selected from the group consisting of fluorosilicones, fluoroalkylalkoxysilanes, and mixtures thereof;
   pouring a monomer liquid into the space between said molds and a gasket; and
   polymerizing the monomer therein.

2. The process as claimed in claim 1, wherein formation of said at least one of said anti-reflecting film and said hard coat film is carried out by coating of a hard coat solution containing at least one release agent.

3. The process as claimed in claim 2, wherein said hard coat solution comprises said at least one release agent, at least one refractive index-adjusting component, at least one silane coupling agent and at least one hardening agent.

4. The process as claimed in claim 2, wherein said at least one release agent is at least one fluoroalkylalkoxysilane.

5. The process of claim 4 wherein said release agent is 3,3,3-trifluoropropyltrimethoxysilane or fluorooctyltrimethoxysilane.

6. The process according to claim 3, wherein said at least one refractive index-adjusting component is selected from the group consisting of colloidal silica, colloidal antimony oxide, colloidal titanium, and mixtures thereof.

7. The process as claimed in claim 3, wherein said silane coupling agent is selected from the group consisting of (a) compounds represented by the following general formula:

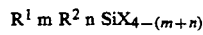

$$R^1{}_m R^2{}_n SiX_{4-(m+n)}$$

wherein $R^1$ is an alkyl group, an alkenyl group, a phenyl group or a halogen atom, $R^2$ is an organic group having at least one constituent selected from the group consisting of epoxy, glycidoxy, amino, amide, mercapto, methacryloyloxy, cyano and aromatic group having at least one substituent, X is a hydrolyzable group selected from the group consisting of a halogen, an alkoxy group, an alkoxyalkoxy group and an acyloxy group, each of m and n is a value of from 0 to 2, and $m+n \leq 3$, and (b) a full or partial hydrolysate thereof.

8. The process as claimed in claim 7, wherein said at least one silane coupling agent is a hydrolysate of at least one compound selected from the group consisting of γ-glycidoxypropyltrimethoxysilane, γ-glycidoxypropylmethyldiethoxysilane, and β-(3,4-epoxycyclohexyl)ethyltrimethoxysilane.

9. The process as claimed in claim 8, wherein said at least one hardening agent is aluminum acetylacetonate.

10. The process as claimed in claim 3, wherein said at least one hardening agent is selected from the group consisting of organic amines, amino acids, metal acetylacetonates, metal salts of organic acids, Lewis acids, and mixtures thereof.

11. A process for the production of a plastic lens which comprises:
applying a release agent to working surfaces of a pair of molds, said release agent comprising a compound selected from the group consisting of fluorosilicones, fluoroalkylalkoxysilanes, and mixtures thereof;
forming at least one of an anti-reflecting film and a hard coat film on the release agent layer applied to said working surfaces of the molds;
pouring a monomer liquid into the space between said pair of molds and a ring gasket; and
polymerizing the monomer therein.

12. The process according to claim 11, wherein said release agent is a fluorosilicone.

13. The process as claimed in claim 11, wherein formation of said at least one of said anti-reflecting film and said hard coat film is carried out by coating of a hard coat solution.

14. The process as claimed in claim 13, wherein said hard coat solution comprises at least one refractive index-adjusting component, at least one silane coupling agent and at least one hardening agent.

15. The process as claimed in claim 14, wherein said silane coupling agent is selected from the group consisting of (a) compounds represented by the following general formula:

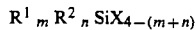

$$R^1{}_m R^2{}_n SiX_{4-(m+n)}$$

wherein $R^1$ is an alkyl group, an alkenyl group, a phenyl group or a halogen atom, $R^2$ is an organic group having at least one constituent selected from the group consisting of epoxy, glycidoxy, amino, amide, mercapto, methacryloyloxy, cyano and aromatic group having at least one substituent, X is a hydrolyzable group selected from the group consisting of a halogen, an alkoxy group, an alkoxyalkoxy group and an acyloxy group, each of m and n is a value of from 0 to 2, and $m+n \leq 3$, and (b) a full or partial hydrolysate thereof.

16. The process as claimed in claim 15, wherein said at least one silane coupling agent is a hydrolysate of at least one compound selected from the group consisting of γ-glycidoxypropyltrimethoxysilane, γ-glycidoxypropylmethyldiethoxysilane, and β-(3,4-epoxycyclohexyl)ethyltrimethoxysilane.

17. The process as claimed in claim 14, wherein said at least one hardening agent is selected from the group consisting of organic amines, amino acids, metal acetylacetonates, metal salts of organic acids, Lewis acids, and mixtures thereof.

18. The process as claimed in claim 17, wherein said at least one hardening agent is aluminum acetylacetonate.

19. The process as claimed in claim 11, wherein formation of said at least one of said anti-reflecting film and said hard coat film is carried out by vacuum deposition of inorganic substances.

20. The process as claimed in claim 19, wherein said inorganic substances comprise oxides, halides, sulfides, and mixtures thereof.

21. The process as claimed in claim 19, wherein said inorganic substances comprise a combination of substances having a low refractive index and substances having a moderate or high refractive index.

22. The process of claim 21, wherein said substances having a low refractive index are selected from the group consisting of $Mg_2F_2$, $SiO_2$, $Na_3(AlF_4)$ and mixtures thereof.

23. The process of claim 21, wherein said substances having a moderate or high refractive index are selected from the group consisting of $Al_2O_3$, $CeF_3$, mixtures of MgO and $Al_2O_3$, $ThO_2$, $Nd_2O_3$, $ZrO_2$, $CeO_2$, $TiO_2$, $Nb_2O_5$, $Ta_2O_5$, $Y_2O_3$, $Yb_2O_3$, ZnS and mixtures thereof.

24. The process as claimed in claim 19, wherein said anti-reflecting film is composed of three layers having an optical film thickness of ¼, ¼ and ¼, or ¼, ¼ and ¼ of design wavelength.

25. The process as claimed in claim 19, wherein formation of said anti-reflecting film is carried out by vacuum deposition of said inorganic substances, and formation of said hard coat film is carried out by coating an organic hard coat solution.

26. The process as claimed in claim 25, wherein said organic hard coat solution comprises at least one refractive index-adjusting component, at least one silane coupling agent and at least one hardening agent.

* * * * *

UNITED STATES PATENT AND TRADEMARK OFFICE
CERTIFICATE OF CORRECTION

PATENT NO. : 5,096,626
DATED : March 17, 1992
INVENTOR(S) : M. TAKAMIZAWA et al.

It is certified that error appears in the above-indentified patent and that said Letters Patent is hereby corrected as shown below:

On the cover, in section [56], "References Cited", "FOREIGN PATENT DOCUMENTS", line 1, change "7/1956" to ---7/1981---.

On the cover, in section [56], "References Cited", "OTHER PUBLICATIONS", insert ---Copy of Reexamination Certificate for U.S. Patent No. B14,544,572---.

On the cover, in section [57], "ABSTRACT", line 3, after "turbidities," insert ---or---.

Signed and Sealed this

Eleventh Day of February, 1997

Attest:

BRUCE LEHMAN

*Attesting Officer*  *Commissioner of Patents and Trademarks*